United States Patent [19]

Miller

[11] Patent Number: 5,089,672

[45] Date of Patent: Feb. 18, 1992

[54] FLEXIBLE ELECTRICALLY CONDUCTIVE CONTACT FOR A SWITCH WHICH IS ACTUATED UPON FORCE BEING APPLIED THERETO

[75] Inventor: Norman K. Miller, Concordville, Pa.

[73] Assignee: Miller Edge, Inc., Concordville, Pa.

[21] Appl. No.: 584,834

[22] Filed: Sep. 19, 1990

[51] Int. Cl.⁵ .......................... H01H 3/16; H01H 1/02
[52] U.S. Cl. ............................... 200/61.43; 200/86 R; 200/275
[58] Field of Search ............... 200/61.43, 61.44, 86 R, 200/86 A

[56] References Cited

U.S. PATENT DOCUMENTS

| | | | |
|---|---|---|---|
| Re. 28,365 | 3/1975 | Brave | 200/86 R |
| 363,290 | 5/1887 | Freeman | 200/86 R |
| 3,315,050 | 4/1967 | Miller | 200/61.43 |
| 3,396,252 | 8/1968 | Serizawa et al. | 200/86 R |
| 3,462,885 | 8/1969 | Miller | 49/488 |
| 3,812,313 | 5/1974 | Wolf et al. | 200/86 R |
| 4,090,045 | 5/1978 | Marsh | 200/5 A |
| 4,362,911 | 12/1982 | Sears et al. | 200/5 A |
| 4,396,814 | 8/1983 | Miller | 200/61.43 |
| 4,401,896 | 8/1983 | Fowler et al. | 307/118 |
| 4,497,989 | 2/1985 | Miller | 200/86 R |
| 4,661,664 | 4/1987 | Miller | 200/86 R |
| 4,785,143 | 10/1988 | Miller | 200/61.43 |
| 4,920,241 | 4/1990 | Miller | 200/86 R |
| 4,954,673 | 9/1990 | Miller | 200/61.43 |

*Primary Examiner*—J. R. Scott
*Attorney, Agent, or Firm*—Panitch Schwarze Jacobs & Nadel

[57] ABSTRACT

A flexible, electrically conductive contact for a switch which is actuated upon force being applied thereto includes a first plurality of generally flexible fibers. One portion of the first plurality of fibers is constructed of an electrically nonconductive material. Another portion of the first plurality of fibers is constructed of an electrically conductive material. The flexible, electrically conductive contact further includes a second plurality of generally flexible fibers. One portion of the second plurality of fibers is constructed of an electrically nonconductive material. Another portion of the second plurality of fibers is constructed of an electrically conductive material. The second plurality of fibers is interwoven with the first plurality of fibers in the form of a sheet with the electrically conductive first plurality of fibers in engagement with the electrically conductive second plurality of fibers to form a flexible, electrically conductive sheet.

30 Claims, 3 Drawing Sheets

FLEXIBLE ELECTRICALLY CONDUCTIVE CONTACT FOR A SWITCH WHICH IS ACTUATED UPON FORCE BEING APPLIED THERETO

FIELD OF THE INVENTION

The present invention relates to a sensing edge for a door and, more particularly, to a sensing edge having flexible, electrically conductive contacts for causing a closing door to open by by actuating a device upon application of force to the sensing edge.

BACKGROUND OF THE INVENTION

The use of flexible, electrically conductive contacts in switches for sensing edges is generally known. Such sensing edges generally include an elongate sheath enclosing a pair of compressible sheets sandwiching a third perforated compressible sheet. Attached to the opposing faces of the pair of compressible sheets are flexible, electrically conductive contacts Upon application of pressure to the sheath, the flexible, electrically conductive contacts are deflected through the perforations of the sandwiched compressible sheet into electrically conductive engagement with each other to thereby actuate suitable circuitry for controlling the door.

The problems associated with such sensing edges are inherent in the material used for the flexible, electrically conductive contacts. Typical contacts are constructed of thin sheets of metal (e.g., aluminum foil). These thin sheets are sometimes adhesively mounted on a nonconductive backing (e.g., plastic sheeting, plastic film, asbestos fabric). An inherent property, as well as problem, associated with the metallic sheets is memory. When the metal is folded or dented it tends to retain its new shape. Continued folding and denting of metallic contacts causes fatigue and eventually breakage. Since the sheets of metal which make up the contact are relatively thin, the strength of the sheet is limited.

Consequently, there exists a need in the sensing edge field for a flexible, electrically conductive contact with improved flexibility and durability and which minimizes the adverse effects of memory and fatigue.

The present invention is directed to a flexible, electrically conductive contact for use with a sensing edge to cause a closing door to open by actuating a device upon application of force to the sensing edge. The present invention overcomes many of the disadvantages inherent in the above-described flexible, electrically conductive contacts by providing a flexible, electrically conductive contact which is comprised of a plurality of interwoven generally flexible fibers wherein a portion of these fibers are constructed of an electrically conductive material. The flexible, electrically conductive contacts of the present invention are generally memoryless when folded or dented. Thus, the flexible, electrically conductive contact of the present invention are durable to thereby reduce repair and/or replacement costs. Accordingly, use of the present invention results in considerable savings in money as well as time for repair and reconstruction and/or replacement of sensing edges.

SUMMARY OF THE INVENTION

Briefly stated, the present invention comprises a flexible, electrically conductive contact for a switch which is actuated upon force being applied thereto. The flexible, electrically conductive contact includes a first plurality of generally flexible fibers. One portion of the first plurality of fibers is constructed of an electrically nonconductive material. Another portion of the first plurality of fibers is constructed of an electrically conductive material. The flexible, electrically conductive contact further includes a second plurality of generally flexible fibers. One portion of the second plurality of fibers is constructed of an electrically nonconductive material. Another portion of the second plurality of fibers is constructed of an electrically conductive material. The second plurality of fibers is interwoven with the first plurality of fibers in the form of a sheet with the electrically conductive portion of the first plurality of fibers in engagement with the electrically conductive portion of the second plurality of fibers whereby a flexible, electrically conductive sheet is formed.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings embodiments which are presently preferred, it being understood, however, that this invention is not limited to the specific methods and instrumentalities disclosed. In the drawings.

DESCRIPTION OF PREFERRED EMBODIMENT

Figure 1:
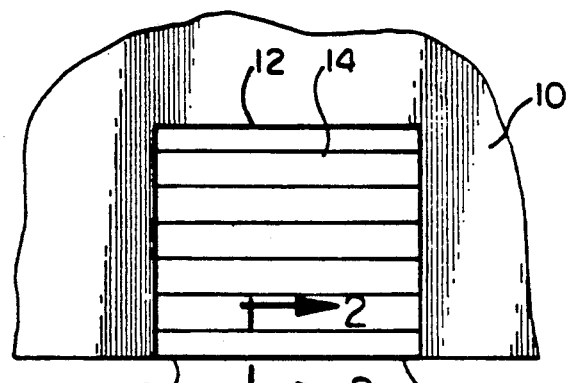
FIG. 1 is a front elevational view showing a door construction including a sensing edge in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the sensing edge and designated parts thereof. The terminology includes the words above specifically mentioned, derivatives thereof and words of similar import.

Referring to the drawing in detail, wherein like numerals indicate like elements throughout, there is shown in FIGS. 1-5, a first preferred embodiment of a sensing edge having flexible, electrically conductive contacts in accordance with the present invention. There is shown in FIG. 1, a building wall 10 having a doorway 12 provided with a door 14. While the door 14, as illustrated, is an overhead door having a sensing edge 16 in accordance with the present invention along its lower side or leading edge 18, it is within the spirit and scope of the invention to incorporate the sensing edge 16 described hereinafter along the edge of any door structure, such as vertically disposed or horizontally moveable doors (not shown) as desired. Moreover, it is understood by those skilled in the art, that the sensing edge 16 is not limited to use with doors, but can be used for other applications, such as automatic windows.

Figure 2:
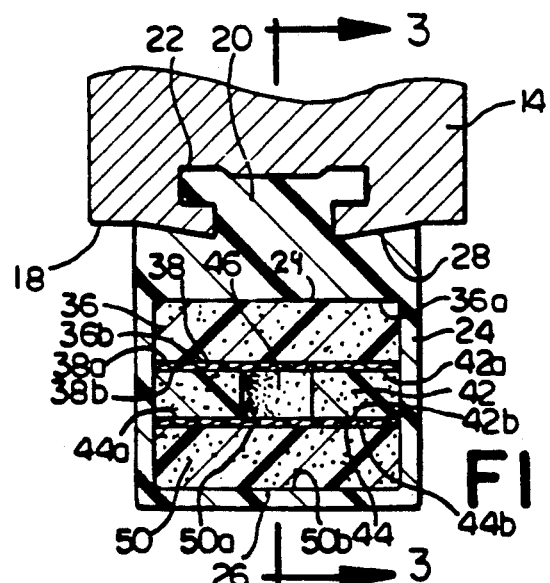
FIG. 2 is a greatly enlarged cross-sectional view of the sensing edge of FIG. 1 taken along line 2—2 of FIG. 1.

Referring now to FIG. 2, the sensing edge 16 and the door 14 include securing means for fixing the sensing edge 16 to the leading edge 18 of the door 14. In the presently preferred embodiment, the securing means is comprised of a generally T-shaped member 20 on the sensing edge 16 positioned within a complementary T-shaped slot 22 in the lower surface of the door 14. More particularly, the generally T-shaped member 20 extends from an elongate outer sheath 24 of the sensing edge 16. Of course, the sensing edge 16 may be secured to the door 14 in any other suitable manner, for instance, with a traditional dovetail slot configuration (not shown). Moreover, it is also within the spirit and scope of the invention to secure the sensing edge 16 to the leading edge 18 of the door 14 by an adhesive (not shown) applied between the leading edge 18 and a peripheral face of the sensing edge 16.

Figure 3:
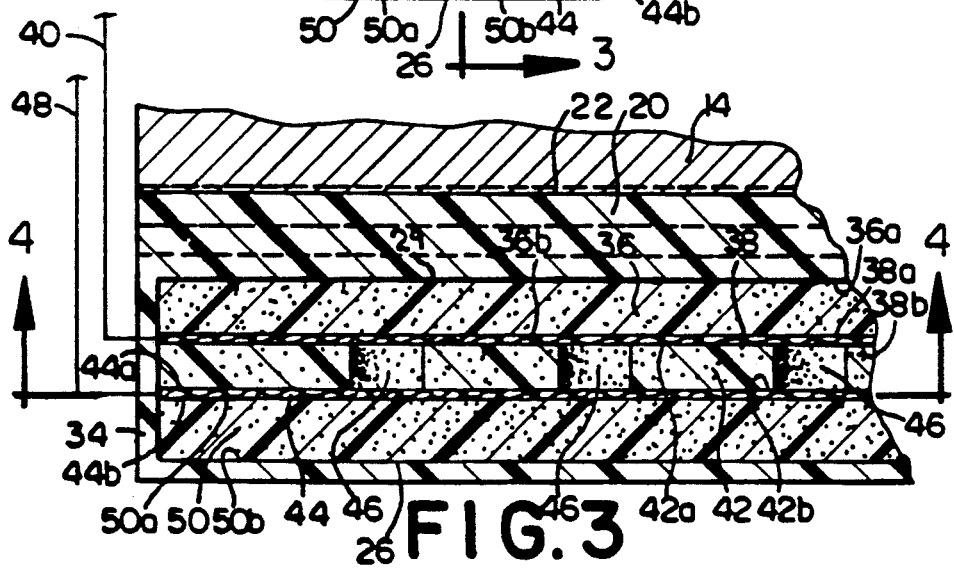
FIG. 3 is a cross-sectional view of the sensing edge of FIG. 2 taken along line 3—3 of FIG. 2.

Referring now to FIGS. 2 and 3, as mentioned previously, the sensing edge 16 includes an elongate outer sheath 24 compressible upon application of external pressure and fabricated of flexible air impervious material. The sheath 24 has a wall with an interior surface 26 and an exterior surface 28. The T-shaped member 20 extends from the exterior surface 28 of the sheath 24. It is preferred that the sheath 24 have a generally constant cross-sectional configuration, extending along the leading edge 18 of the door 14. In the presently preferred embodiment, the sheath 24 is generally of rectangular cross section, but may be of any other suitable cross-sectional configuration, such as circular or semi-circular (not shown).

In the present embodiment, it is preferred that the sheath 24 be fabricated of a form retaining, but flexible air impervious material, such as rubber. The lower portion of the exterior surface 28 of the sheath 24 is for engagement with the door threshold or ground (see FIG. 1). The T-shaped member 20 is formed with the sheath 24 along the upper portion of the exterior surface 28 for releasably interconnecting engagement with the leading edge 18, thereby facilitating quick and easy mounting or removal and replacement of the sensing edge 16 with respect to the door 14. As shown in FIG. 3, end walls 34 (only one shown) close and seal the ends of the sheath 24.

Referring now to FIGS. 2 and 3, a first sheet of resiliently compressible material 36 is positioned within the sheath 24 and includes a first face 36a and a second face 36b. The first face 36a of the first sheet of resiliently compressible material 36 is in engagement or corresponding facing relationship with the upper portion of the interior surface 26 of the sheath 24.

In the present embodiment, it is preferred that the first sheet of resiliently compressible material 36 and succeeding layers and sheets, described hereinafter, be generally sized to complement the internal configuration of the area enclosed by the sheath 24. However, it is understood by those skilled in the art, that the first sheet of resiliently compressible material 36 and succeeding layers can be sized as wide or as narrow as desired, and be of virtually any length for accommodating different structures and uses.

In the present embodiment, it is preferred that the first sheet of resiliently compressible material 36 be constructed of generally soft foam rubber. It is understood by those skilled in the art, that the first sheet of resiliently compressible material 36 can be constructed of either closed or open cell foam rubber or of other materials having similar properties.

Just below (when viewing FIGS. 2 and 3) the first sheet of resiliently compressible material 36 is a first flexible, electrically conductive contact 38 having a first face 38a and a second face 38b. The first face 38a of the first flexible, electrically conductive contact 38 is in engagement or in corresponding facing relationship with the second face 36b of the first sheet of resiliently compressible material 36. The details of the first flexible, electrically conductive contact 38 are described hereinafter.

As shown in FIG. 3, an electrical conductor or wire 40 is electrically connected to the first flexible, electrically conductive contact 38 preferably by soldering at one end thereof. The electrical conductor 40 is used in connection with a circuit (not shown) for controlling the actuation of the device (not shown) employed for operation of the door 14, as is understood by those skilled in the art, in response to the application of force to the sheath 24, as described hereinafter.

The first flexible, electrically conductive contact 38 is in engagement with a layer of nonconductive material 42 having a first face 42a and a second face 42b for spacing apart the first flexible, electrically conductive contact 38 and a second flexible, electrically conductive contact 44. The layer of nonconductive material 42 has at least one opening extending therethrough between the first and second faces 42a, 42b thereof. As shown in FIG. 3, the layer of nonconductive material 42, preferably includes a plurality of openings 46 interspersed therealong, for reasons described hereinafter. The first face 42a of the layer of nonconductive material 42 is in engagement or corresponding facing relationship with a second face 38b of the first flexible, electrically conductive contact 38.

In the present embodiment, it is preferred that the openings 46 be generally oval-shaped in cross section. However, it is within the spirit and scope of the invention to configure the openings 46 of any other suitable geometric shape, such as square or circular. The layer of nonconductive material 42 is preferably constructed of generally soft foam rubber. It is understood by those skilled in the art, that the layer of nonconductive material 42 can be constructed of either closed or open cell foam rubber or other materials having similar properties, so long as the function of the sensing edge 16 is achieved, as described hereinafter.

The layer of nonconductive material 42 is in engagement with a second flexible, electrically conductive contact 44 having a first face 44a and a second face 44b. The first face 44a of the second flexible, electrically conductive contact 44 is in engagement or corresponding facing relationship with the second face 42b of the layer of nonconductive material 42.

The second flexible, electrically conductive contact 44 is connected to an electrical conductor or wire 48 for connection with a circuit for controlling the actuation of the door 14 or device in response to the application of force to the sheath 24.

Figure 4:
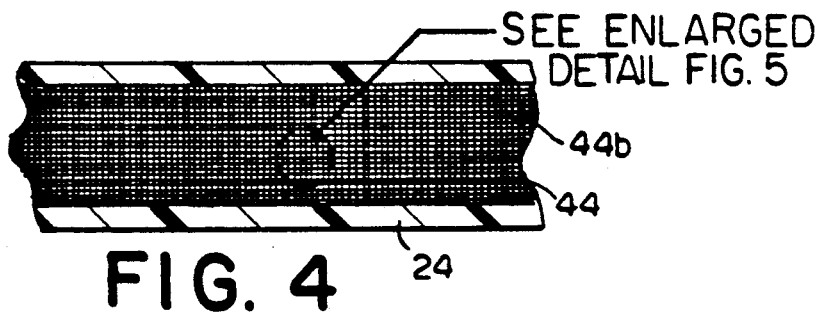
FIG. 4 is a cross-sectional view of a flexible, electrically conductive contact in accordance with the present invention taken along line 4—4 of FIG. 3.
Figure 5:
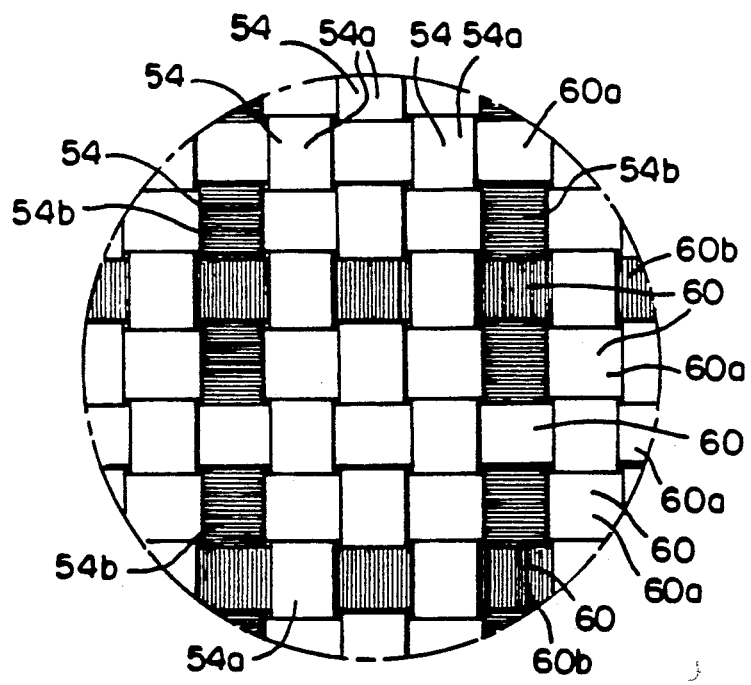
FIG. 5 is a greatly enlarged fragmentary view of a portion of the flexible, electrically conductive contact of FIG. 4.

Now referring to FIGS. 4 and 5, each of the first and second flexible, electrically conductive contacts 38, 44 comprise a first plurality of generally flexible fibers 54, wherein one portion 54a of the first plurality of fibers 54 is constructed of electrically nonconductive material. In the present embodiment, it is preferred that the electrically nonconductive material be cotton. However, it is understood by those skilled in the art, that the electrically nonconductive fibers 54a can be constructed of polymeric materials such as "DACRON", "KEVLAR" or the like.

The other remaining portion 54b (shaded) of the first plurality of generally flexible fibers 54 is constructed of an electrically conductive material. In the present embodiment, it is preferred that the electrically conductive material be a metallic material, such as copper. However, it is understood by those skilled in the art, that the electrically conductive fibers can be constructed of other metallic or electrically conductive materials, such as aluminum or brass.

In the presently preferred embodiment, each of the fibers of the first plurality of fibers 54 is constructed of a plurality of intertwined filaments which form a single fibrous strand. However, it is understood by those skilled in the art, that each of the fibers of the first plurality of fibers 54 can be of single piece construction, without departing from the spirit and scope of the invention.

Each of the first and second flexible, electrically conductive contacts 38, 44 further comprise a second plurality of generally flexible fibers 60, wherein one portion 60a of the second plurality of fibers 60 is constructed of an electrically nonconductive material. The electrically nonconductive material of the second plurality of fibers 60 is preferably the same as the electrically nonconductive material of the first plurality of fibers 54. However, it is understood by those skilled in the art, that the electrically nonconductive material of the one portion of the first plurality of fibers 54 could be different from the electrically nonconductive material of the one portion of the second plurality of fibers 60.

The other remaining portion 60b (shaded) of the second plurality of generally flexible fibers 60 is constructed of an electrically conductive material. The electrically conductive material of the other portion of the second plurality of fibers 60 is preferably the same as the electrically conductive material of the other portion of the first plurality of fibers 54. However, it is understood by those skilled in the art, that the electrically conductive materials could be different.

In the present embodiment, for both the first and second plurality of generally flexible fibers 54, 60, the ratio of electrically nonconductive fibers to electrically conductive fibers is preferably three to one, respectively. That is, it is preferred that the electrically conductive fibers be spaced apart by three electrically nonconductive fibers in a repeating pattern. However, it is understood by those skilled in the art, that other ratios can be used, such as two to one or five to one, without departing from the spirit and scope of the invention.

As shown in FIGS. 4 and 5, the second plurality of generally flexible fibers 60 are preferably interwoven with the first plurality of generally flexible fibers 54 in the form of a sheet first plurality of fibers 54 in engagement with the electrically conductive fibers 60b of the second plurality of fibers 60 such that a flexible, electrically conductive contact or sheet is formed with electrical continuity over generally the entire contact or sheet.

In the present embodiment, it is preferred that the first and second plurality of fibers 54, 60 be intertwined such that the first plurality of fibers 54 extend generally perpendicularly with respect to the second plurality of fibers 60. Similarly, it is preferred that the first plurality of fibers 54 extend generally parallel with respect to each other and that the second plurality of fibers 60 extend generally parallel with respect to each other. However, it is understood by those skilled in the art, that the first and second plurality of fibers 54, 60 could be intertwined in any manner without departing from the spirit and scope of the invention. For instance, the type of weave used could be basic, such as a plain weave, a till weave, a satin weave, etc. or more complex such as an interlooping weave or braid. The type of weave is not pertinent to the present invention so long as the fibers of the electrically conductive portion 54b of the first plurality of fibers 54 are in engagement with the fibers of the electrically conductive portion 60b of the second plurality of fibers 60. Furthermore, the electrically conductive contacts 38, 44 can be sized as wide or as narrow as desired, and be of virtually any length for accommodating different structures and uses.

Referring again to FIGS. 2 and 3, in engagement with the second flexible, electrically conductive contact 44 is a second sheet of resiliently compressible material 50 having a first face 50a and a second face 50b. The first face 50a of the second sheet of resiliently compressible material 50 is in engagement or corresponding facing relationship with the second face 44b of the second flexible, electrically conductive contact 44. The second face 50b of the second sheet of resiliently compressible material 50 is in engagement with the lower portion of the interior surface 26 of the sheath 24.

The second sheet of resiliently compressible material 50 is preferably constructed of the same material and configured generally identically to the first sheet of resiliently compressible material 36. However, it is apparent to those skilled in the art, that the first and second sheets of resiliently compressible material 36, 50 can differ in configuration, size and/or material.

As shown in FIG. 3, the first and second flexible, electrically conductive contacts 38, 44 are spaced apart by the layer of nonconductive material 42 and present opposed portions to each other through the openings 46. Upon the application of force to sheath 24, a portion of at least one of the first and second flexible, electrically conductive contacts 38, 44 deflects into at least one of the openings 46 in the layer of nonconductive material 42, and makes electrical contact between the first and second flexible, electrically conductive contacts 38, 44 to thereby actuate the device. More specifically, one or more of the conductive fibers of each of the first and second flexible, electrically conductive contacts 38, 44 engage each other to complete electrical contact therebetween, thereby electrically connecting wires 40, 48.

In use, the sheath 24 is connected to the door 14 using the T-shaped member 20, as described above. The electrical conductors or wires 40, 48 are connected to a circuit (not shown) for controlling the operation or actuation of a device (not shown) for controlling the actuation of the door 14 in response to the application of force to the sheath 24. Specifically, upon the application of force to the lower portion of the exterior surface 26 of the sheath 24, a portion of at least one of the first and second flexible, electrically conductive contacts 38, 44 deflects into at least one of the openings 46 in the layer of nonconductive material 42 and makes electrical contact between the first and second flexible, electrically conductive contacts 38, 44 to thereby complete or enable the circuit to actuate the device and control the actuation of the door 14.

Figure 6:
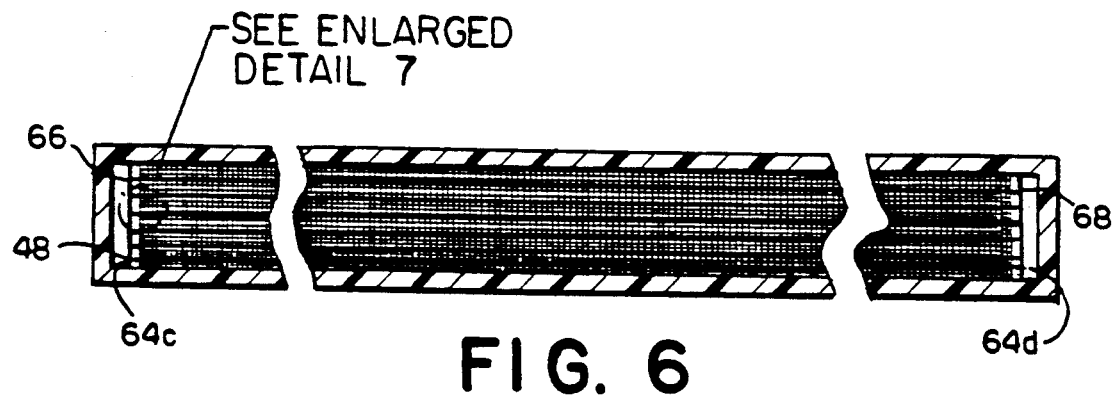
FIG. 6 is a cross-sectional view of an alternate embodiment for the flexible, electrically conductive contact in accordance with the present invention taken along line 4—4 of FIG. 3.
Figure 7:
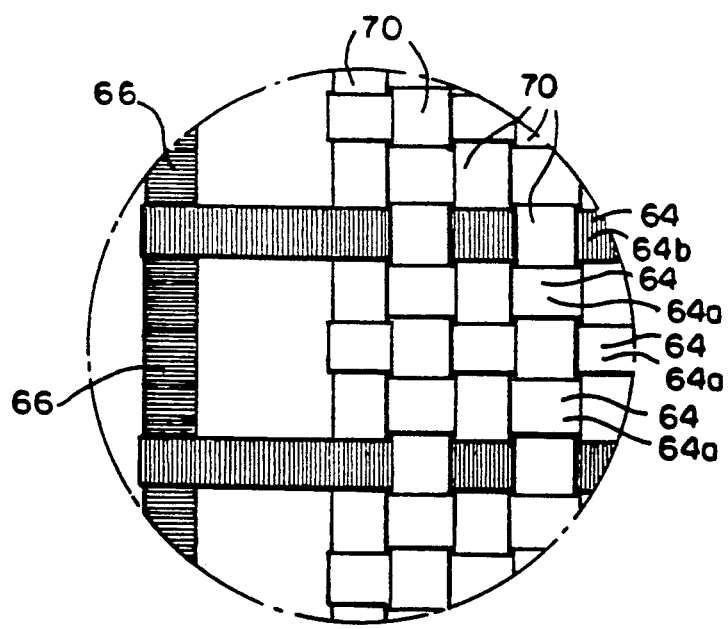
FIG. 7 is a greatly enlarged fragmentary view of a portion of the flexible, electrically conductive contact of FIG. 6.

An alternate embodiment of the first and second flexible, electrically conductive contacts 38, 44 is shown in FIGS. 6 and 7. In the alternate embodiment, the first and second flexible, electrically conductive contacts 38, 44 each comprise a first plurality of fibers 64 having a first end 64c and a second end 64d. The first plurality of fibers 64 are preferably generally identical to the first plurality of fibers 54 described above in connection with FIGS. 4 and 5.

Each of the first and second flexible, electrically conductive contacts 38, 44 further comprise a second plurality of generally flexible fibers 70 constructed of an electrically nonconductive material. The electrically nonconductive material of the second plurality of fibers 70 is preferably the same as the electrically nonconductive material of the first plurality of fibers 64. However, it is understood by those skilled in the art, that the electrically nonconductive material of the first plurality of fibers 64 could be different from the electrically nonconductive material of the second plurality of fibers 70.

As shown in FIGS. 6 and 7, the second plurality of generally flexible fibers 70 are preferably interwoven with the first plurality of generally flexible fibers 64 in the form of a sheet. In the alternate embodiment, it is preferred that the first and second plurality of fibers 64, 70 be intertwined such that the first plurality of fibers 64 extend generally perpendicularly with respect to the second plurality of fibers 70. Similarly, it is preferred that first plurality of fibers 64 extend generally parallel with respect to each other and that the second plurality of fibers 70 extend generally parallel with respect to each other.

However, it is understood by those skilled in the art, that the first and second plurality of fibers 64, 70 could be intertwined in any manner without departing from the spirit and scope of the invention. For instance, the type of weave used could be basic, such as a plain weave, a till weave, a satin weave, etc., or more complex such as an interlooping weave or braid. The type of weave is not pertinent to the present invention. Furthermore, the flexible, electrically conductive contacts of the alternate embodiment can be sized as wide or a narrow as desired, and be of virtually any length for accommodating different structures and uses.

Each of the first and second flexible, electrically conductive contacts 38, 44 further comprise a first electrically conductive contact member 66 positioned proximate to the contact and in electrical communication with the first end 64c of the electrically conductive fibers 64b of the first plurality of fibers 64. Also, a second electrically conductive contact member 68 is positioned proximate to the sheet and in electrical communication with the second end 64d of the electrically conductive fibers 64b of the first plurality of fibers 64. The first and second electrically conductive contacts 66, 68 are preferably constructed of the same metallic material as the electrically conductive fibers 64b. However, it is understood by those skilled in the art, that the electrically conductive contacts 66, 68 can be constructed of other metallic or electrically conductive materials, such as aluminum or brass.

The alternate embodiment allows one or more of the electrically conductive fibers 64b to be severed without affecting the overall conductibility of the contact because the electrically conducting contacts 66, 68 pass current to all of the electrically conducting fibers 64b. The use of the alternate embodiment is generally identical to the use of the preferred embodiment as described above.

From the foregoing description, it can be seen that the present invention comprises a flexible, electrically conductive contact for a switch which is actuated upon force being applied thereto. It is appreciated by those skilled in the art, that changes could be made to the embodiments described above without departing from the broad inventive concepts thereof. It is understood, therefore, that this invention is not limited to the particular embodiments disclosed, but it is intended to cover all modifications which are within the spirit and scope of the invention as defined by the appended claims.

I claim:

1. A flexible, electrically conductive contact for a switch which is actuated upon force being applied thereto, said flexible, electrically conductive contact comprising:
   a first plurality of generally flexible fibers, one portion of said first plurality of fibers being constructed of an electrically non-conductive material, another portion of said first plurality of fibers being constructed of an electrically conductive material; and
   a second plurality of generally flexible fibers, one portion of said second plurality of fibers being constructed of an electrically non-conductive material, another portion of said second plurality of fibers being constructed of an electrically conductive material, said second plurality of fibers being interwoven with said first plurality of fibers in the form of a sheet with said electrically conductive portion of the first plurality of fibers in engagement with said electrically conductive portion of the second plurality of fibers, said one portion of said first plurality of fibers being interwoven with said another portion of said second plurality of fibers and said one portion of said second plurality of fibers being interwoven with said another portion of said first plurality of fibers whereby a flexible, electrically conductive sheet is formed.

2. The conductive contact as recited in claim 1, wherein said electrically nonconductive material of said first and second plurality of fibers is a polymer.

3. The conductive contact as recited in claim 1, wherein said electrically conductive material of said first and second plurality of fibers is metallic.

4. The conductive contact as recited in claim 1, wherein said first plurality of fibers extend generally perpendicularly with respect to said second plurality of fibers.

5. The conductive contact as recited in claim 1, wherein said first plurality of fibers and said second plurality of fibers are braided.

6. The conductive contact as recited in claim 1, wherein said first plurality of fibers extend generally parallel with respect to each other and said second plurality of fibers extend generally parallel with respect to each other.

7. The conductive contact as recited in claim 1, wherein each of said fibers of said first and second plurality of fibers is constructed of intertwined filaments.

8. A flexible, electrically conductive contact for a switch which is actuated upon force being applied thereto, said flexible, electrically conductive contact comprising:
- a first plurality of generally flexible fibers, one portion of said first plurality of fibers being constructed of an electrically nonconductive material and another portion of said first plurality of fibers being constructed of an electrically conductive material, said other portion of said first plurality of fibers having a first end and a second end;
- a second plurality of generally flexible fibers being constructed of an electrically nonconductive material, said second plurality of fibers being interwoven with said first plurality of fibers in the form of a sheet;
- a first electrically conductive contact member positioned proximate to said sheet and in electrical communication with said first end of said other portion of said first plurality of fibers; and
- a second electrically conductive contact member positioned proximate to said sheet and in electrical communication with said second end of said other portion of said first plurality of fibers, whereby a flexible, electrically conductive sheet is formed.

9. The conductive contact as recited in claim 8, wherein said electrically nonconductive material of said first and second plurality of fibers is a polymer.

10. The conductive contact as recited in claim 8, wherein said electrically conductive material of said first plurality of fibers is metallic.

11. The conductive contact as recited in claim 8, wherein said first plurality of fibers extend generally perpendicularly with respect to said second plurality of fibers.

12. The conductive contact as recited in claim 8, wherein said first plurality of fibers and said second plurality of fibers are braided.

13. The conductive contact as recited in claim 8, wherein said first plurality of fibers extend generally parallel with respect to each other and said second plurality of fibers extend generally parallel with respect to each other.

14. The conductive contact as recited in claim 8, wherein each of said fibers of said first and second plurality of fibers is constructed of intertwined filaments.

15. A sensing edge for causing a closing door to open by actuating a device upon force being applied to said sensing edge, said sensing edge comprising:
- an elongate sheath compressible upon application of external pressure and fabricated of flexible material, said sheath having a wall with an interior and exterior surface, said exterior surface for being attached to a door edge;
- a first sheet of resiliently compressible material having a first face and a second face, said first face of said first sheet of resiliently compressible material being in engagement with said interior surface of said elongate outer sheath;
- a first flexible, electrically conductive contact having a first face and a second face, said first face of said first flexible, electrically conductive contact being in engagement with said second face of said first sheet of resiliently compressible material;
- a layer of nonconductive material having a first face and a second face, said first face of said layer of nonconductive material being in engagement with said second face of said first flexible, electrically conductive contact, said layer of nonconductive material including at least one opening extending therethrough between said first and second faces thereof;
- a second flexible, electrically conductive contact having a first face and a second face, said first face of said second flexible, electrically conductive contact being in engagement with said second face of said layer of nonconductive material, said first and second flexible, electrically conductive contacts each comprising:
  - a first plurality of generally flexible fibers, one portion of said first plurality of fibers being constructed of an electrically nonconductive material, another portion of said first plurality of fibers being constructed of an electrically conductive material;
  - a second plurality of generally flexible fibers, one portion of said second plurality of fibers being constructed of an electrically nonconductive material, another portion of said second plurality of fibers being constructed of an electrically conductive material, said second plurality of fibers being interwoven with said first plurality of fibers in the form of a sheet with said electrically conductive portion of the first plurality of fibers in engagement with said electrically conductive portion of the second plurality of fibers; and
- a second sheet of resiliently compressible material having a first face and a second face, said first face of said second sheet of resiliently compressible material being in engagement with said second face of said second flexible, electrically conductive contact, said second face of said second sheet of resiliently compressible material being in engagement with said interior surface of said sheath, said first and second flexible, electrically conductive contacts being spaced apart by said layer of nonconductive material and present opposed portions to each other through said opening whereby upon the application of force to said sheath, a portion of at least one of said first and second flexible, electrically conductive contacts deflects into the opening in said layer of nonconductive material and makes electrical contact between said first and second flexible, electrically conductive contacts to thereby actuate the device.

16. The sensing edge as recited in claim 15, wherein said electrically nonconductive material of said first and second plurality of fibers is a polymer.

17. The sensing edge as recited in claim 15, wherein said electrically conductive material of said first plurality of fibers is metallic.

18. The sensing edge as recited in claim 15, wherein said first plurality of fibers extend generally perpendicularly with respect to said second plurality of fibers.

19. The sensing edge as recited in claim 15, wherein said first plurality of fibers and said second plurality of fibers are braided.

20. The sensing edge as recited in claim 15, wherein said first plurality of fibers extend generally parallel with respect to each other and said second plurality of fibers extend generally parallel with respect to each other.

21. The sensing edge as recited in claim 15, wherein each of said fibers of said first and second plurality of fibers is constructed of intertwined filaments.

22. A sensing edge for causing a closing door to open by actuating a device upon force being applied to said sensing edge, said sensing edge comprising:
- a first sheet of resiliently compressible material having a first face and a second face;
- a first flexible, electrically conductive contact having a first face and a second face, said first face of said first flexible, electrically conductive contact being in engagement with said second face of said first sheet of resiliently compressible material;
- a layer of nonconductive material having a first face and a second face, said first face of said layer of nonconductive material being in engagement with said second face of said first flexible, electrically conductive contact, said layer of nonconductive material including at least one opening extending therethrough between said first and second faces thereof;
- a second flexible, electrically conductive contact having a first face and a second face, said first face of said second flexible, electrically conductive contact being in engagement with said second face of said layer of nonconductive material, said first and second flexible, electrically conductive contacts each comprising:
  - a first plurality of generally flexible fibers, one portion of said first plurality of fibers being constructed of an electrically nonconductive material, another portion of said first plurality of fibers being constructed of an electrically conductive material;
  - a second plurality of generally flexible fibers, one portion of said second plurality of fibers being constructed of an electrically nonconductive material, another portion of said second plurality of fibers being constructed of an electrically conductive material, said second plurality of fibers being interwoven with said first plurality of fibers in the form of a sheet with said electrically conductive portion of the first plurality of fibers in engagement with said electrically conductive portion of the second plurality of fibers; and
- a second sheet of resiliently compressible material having a first face and a second face, said first face of said second sheet of resiliently compressible material being in engagement with said second face of said second flexible, electrically conductive contact, said first and second flexible, electrically conductive contacts being spaced apart by said layer of nonconductive material and present opposed portions to each other through said opening whereby upon the application of force to at least one of said sheets of resiliently compressible material, a portion of at least one of said first and second flexible, electrically conductive contacts deflects into the opening in said layer of nonconductive material and makes electrical contact between said first and second flexible, electrically conductive contacts to thereby actuate the device.

23. The sensing edge as recited in claim 22, wherein said electrically nonconductive material of said first and second plurality of fibers is a polymer.

24. The sensing edge as recited in claim 22, wherein said electrically conductive material of said first and second plurality of fibers is metallic.

25. The sensing edge as recited in claim 22, wherein said first plurality of fibers extend generally perpendicularly with respect to said second plurality of fibers.

26. The sensing edge as recited in claim 22, wherein said first plurality of fibers and said second plurality of fibers are braided.

27. The sensing edge as recited in claim 22, wherein said first plurality of fibers extend generally parallel with respect to each other and said second plurality of fibers extend generally parallel with respect to each other.

28. The sensing edge as recited in claim 22, wherein each of said fibers of said first and second plurality of fibers is constructed of intertwined filaments.

29. The sensing edge as recited in claim 15, wherein said first and second flexible, electrically conductive contacts further comprise said one portion of said first plurality of fibers being interwoven with said another portion of said second plurality of fibers and said one portion of said second plurality of fibers being interwoven with said another portion of said first plurality of fibers.

30. The sensing edge as recited in claim 22, wherein said first and second flexible, electrically conductive contacts further comprise wherein said one portion of said first plurality of fibers being interwoven with said another portion of said second plurality of fibers and said one portion of said second plurality of fibers being interwoven with said another portion of said first plurality of fibers.

* * * * *